United States Patent
Choi

(10) Patent No.: US 9,815,453 B2
(45) Date of Patent: Nov. 14, 2017

(54) HYBRID POWERTRAIN AND METHOD FOR CONTROLLING THE SAME

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 220 days.

(21) Appl. No.: 14/727,171

(22) Filed: Jun. 1, 2015

(65) Prior Publication Data
US 2016/0167644 A1    Jun. 16, 2016

(30) Foreign Application Priority Data
Dec. 12, 2014 (KR) .................. 10-2014-0179069

(51) Int. Cl.
*B60K 6/365* (2007.10)
*B60W 10/00* (2006.01)
(Continued)

(52) U.S. Cl.
CPC ............. *B60W 20/20* (2013.01); *B60K 6/365* (2013.01); *B60K 6/442* (2013.01); *B60W 10/06* (2013.01); *B60W 10/08* (2013.01); *B60W 10/11* (2013.01); *F16H 3/52* (2013.01); *F16H 3/725* (2013.01); *B60W 2510/081* (2013.01); *B60W 2520/10* (2013.01); *B60W 2540/10* (2013.01); *B60W 2710/0644* (2013.01); *B60W 2710/081* (2013.01); *B60Y 2200/10* (2013.01); *B60Y 2300/182* (2013.01); *B60Y 2300/45* (2013.01); *B60Y 2300/60* (2013.01); *B60Y 2400/112* (2013.01); *B60Y 2400/73* (2013.01);

(Continued)

(58) Field of Classification Search
CPC .............................. B60K 6/365; B60W 10/00
See application file for complete search history.

(56) References Cited

U.S. PATENT DOCUMENTS 7,941,259 B2 *   5/2011   Tabata .................. B60W 20/30
                                                                  180/65.21
2005/0209760 A1   9/2005   Tabata et al.
(Continued)

FOREIGN PATENT DOCUMENTS

JP      2005-295771 A     10/2005
KR      10-0802680 B1      2/2008
(Continued)

*Primary Examiner* — Tisha Lewis
(74) *Attorney, Agent, or Firm* — Mintz Levin Cohn Ferris Glovsky and Popeo, P.C.; Peter F. Corless

(57) ABSTRACT

A hybrid powertrain and a method for controlling the powertrain are provided to convert an EV mode, a power slit mode, and a parallel mode based on a driving state. The powertrain includes an input shaft connected to an engine and first and second motors/generators installed within a transmission housing. A planetary gear set is installed on an input shaft and includes a combination of a sun gear, a planetary carrier, and a ring gear. A first output gear is connected to the second motor/generator and a second output gear is connected to the planetary carrier of the planetary gear set. A rotation restraint mechanism restricts a rotation of the input shaft. An overdrive brake is connected to the sun gear of the planetary gear set or the first motor/generator. An output shaft is supplied with power through the first and second output gears.

4 Claims, 6 Drawing Sheets

(51) Int. Cl.
  *B60W 20/20* (2016.01)
  *B60W 10/11* (2012.01)
  *B60W 10/08* (2006.01)
  *B60W 10/06* (2006.01)
  *F16H 3/52* (2006.01)
  *B60K 6/442* (2007.10)
  *F16H 3/72* (2006.01)
  *F16H 37/08* (2006.01)

(52) U.S. Cl.
  CPC ............ *F16H 2037/0873* (2013.01); *F16H 2200/2005* (2013.01); *Y02T 10/6234* (2013.01); *Y02T 10/6286* (2013.01); *Y10S 903/91* (2013.01); *Y10S 903/93* (2013.01)

(56) References Cited

U.S. PATENT DOCUMENTS

| | | |
|---|---|---|
| 2009/0069965 A1 | 3/2009 | Tabata et al. |
| 2009/0069966 A1 | 3/2009 | Tabata et al. |
| 2009/0075774 A1 | 3/2009 | Tabata et al. |
| 2009/0312895 A1 | 12/2009 | Kim et al. |
| 2011/0028262 A1 | 2/2011 | Yamamoto et al. |
| 2011/0319224 A1* | 12/2011 | Takami .................. B60K 6/445 477/3 |
| 2014/0162824 A1 | 6/2014 | Choi et al. |
| 2014/0163790 A1 | 6/2014 | Kim |
| 2015/0099605 A1* | 4/2015 | Choi ...................... B60K 6/365 477/5 |
| 2015/0251530 A1* | 9/2015 | Okuda .................. B60K 6/365 180/65.235 |
| 2015/0266369 A1* | 9/2015 | Scholz .................. B60K 6/365 475/5 |
| 2016/0101680 A1* | 4/2016 | Ahn ...................... B60K 6/365 475/5 |

FOREIGN PATENT DOCUMENTS

| | | |
|---|---|---|
| KR | 100887204 B1 | 3/2009 |
| KR | 10-0957331 B1 | 5/2010 |
| KR | 2011-0013241 A | 2/2011 |
| KR | 10-1393562 B1 | 5/2014 |
| KR | 10-1416422 B1 | 7/2014 |
| KR | 2014-0080638 A | 7/2014 |

* cited by examiner

HYBRID POWERTRAIN AND METHOD FOR CONTROLLING THE SAME

CROSS-REFERENCE TO RELATED APPLICATION

This application is based on and claims the benefit of priority to Korean Patent Application No. 10-2014-0179069, filed on Dec. 12, 2014 in the Korean Intellectual Property Office, the disclosure of which is incorporated herein in its entirety by reference.

TECHNICAL FIELD

The present disclosure relates to a hybrid powertrain, and more particularly, to a hybrid powertrain and a method for controlling the same to effectively implement a conversion of an electric vehicle (EV) mode, a power slit mode, and a parallel mode based on a driving state of a vehicle.

BACKGROUND

A hybrid vehicle is a type vehicle driven by efficiently combining two types of power sources, that is, a vehicle driven by an engine obtaining a torque by combusting fuel (e.g., fossil fuel such as gasoline) and an electric motor obtaining a torque by battery power. The hybrid vehicle is an environmentally-friendly vehicle that adopts an engine and an electric motor as an auxiliary power source to reduce exhaust gas and enhance fuel efficiency and research regarding the hybrid vehicle has been actively conducted to enhance fuel efficiency and develop environmentally-friendly products.

The hybrid vehicle generally uses an engine and a motor (e.g., a motor/generator) and uses the motor/generator having improved low slow torque characteristics at a low speed as a main power source and the engine having relatively high speed torque characteristics at a high speed as a main power source. Therefore, the hybrid vehicle stops an operation of the engine which uses fossil fuel at a low speed section and uses the motor/generator, and therefore exhibits improved fuel efficiency and reduced exhaust gas.

Further, to drive the vehicle, the hybrid powertrain is driven in various driving modes such as an electric vehicle (EV) mode which is a pure electric vehicle mode using the torque of the motor and a hybrid electric vehicle (HEV) mode which uses the torque of the motor as auxiliary power while using the torque of the engine as main power. In particular, the engine starts to perform a mode conversion from the EV mode into the HEV mode. Recently, a technology development for implementing a mode conversion between the power split mode and the parallel mode by subdividing the HEV mode into the power split mode and the parallel mode to increase power transfer efficiency has been conducted.

SUMMARY

The present disclosure provides a hybrid powertrain and a method for controlling the same to effectively implement optimal driving while improving power transfer efficiency, drivability, exhaust performance, and the like by effectively performing a conversion of a multi mode such as an EV mode, a power split mode, and a parallel mode depending on driving conditions.

According to an exemplary embodiment of the present disclosure, a hybrid powertrain may include: an input shaft configured to be connected to an engine; first and second motors/generators configured to be installed within a transmission housing; a planetary gear set configured to be installed on an input shaft and include a combination of a sun gear, a planetary carrier, and a ring gear; a first output gear configured to be connected to the second motor/generator; a second output gear configured to be connected to the planetary carrier of the planetary gear set; at least one rotation restraint mechanism configured to selectively restrict a rotation of the input shaft; an overdrive brake configured to be connected to at least one of the sun gear of the planetary gear set and the first motor/generator; and an output shaft configured to be supplied with power via the first and second output gears.

The rotation restraint mechanism may be configured of any one of a one way clutch, a two way clutch, and a brake. A deceleration unit configured to decelerate power and transfer the decelerated power to the output shaft may be disposed between the first and second output gears and the output shaft.

In particular, the deceleration unit may include: first and second central shafts disposed in parallel with the input shaft and the output shaft; a first central gear disposed on the first central shaft to mesh (e.g., to interlock with, to correspond to, and the like) with the first output gear; a second central gear configured disposed on the second central shaft to mesh with the second output gear; and a power synthetic mechanism configured to be installed to connect the first and second central shafts to the output shaft. The power synthetic mechanism may include: a first synthetic gear disposed at one end of the first central shaft; a second synthetic gear disposed at one end of the second central shaft to mesh with the first synthetic gear; and a third synthetic gear configured disposed in the middle of the output shaft to mesh with the second synthetic gear.

According to another exemplary embodiment of the present disclosure, a hybrid powertrain may include: an input shaft connected to an engine; an output shaft configured to be supplied with rotation power via the input shaft; a planetary gear set configured to be installed on the input shaft and have at least three rotating elements; a first motor/generator configured to be connected to any one of the rotating elements of the planetary gear set; a second motor/generator configured to transfer the rotating power to the output shaft; an overdrive brake configured to adjust the rotating power of the first motor/generator to be transferred to the planetary gear set; and at least one rotation restraint mechanism configured to selectively restrict a rotation of the input shaft, wherein the overdrive brake may be configured to perform coupling and decoupling operations based on whether revolutions per minute (RPM) of the first motor/generator approaches 0.

The planetary gear set may have a sun gear, a planetary carrier, and a ring gear and the first motor/generator may be connected to the sun gear of the planetary gear set, and the second motor/generator may be connected to a first output gear and the planetary carrier of the planetary gear set may be connected to a second output gear. The rotation restraint mechanism may be configured of any one of a one way clutch, a two way clutch, and a brake. A deceleration unit configured to decelerate power and transfer the decelerated power to the output shaft may be disposed between the first and second output gears and the output shaft.

The deceleration unit may include: first and second central shafts disposed in parallel with the input shaft and the output shaft; a first central gear disposed on the first central shaft to mesh with the first output gear; a second central gear disposed on the second central shaft to mesh with the second output gear; and a power synthetic mechanism configured to be installed to connect the first and second central shafts to the output shaft. The power synthetic mechanism may include: a first synthetic gear disposed at one end of the first central shaft; a second synthetic gear disposed at one end of the second central shaft to mesh with the first synthetic gear; and a third synthetic gear disposed in the middle of the output shaft to mesh with the second synthetic gear.

According to still another exemplary embodiment of the present disclosure, a method for controlling a hybrid powertrain including a planetary gear set configured to be installed on an input shaft, first and second motors/generators, an overdrive brake configured to transfer rotation power of the first motor/generator to the planetary gear set, and at least one rotation restraint mechanism configured to selectively limit a rotation of the input shaft, the method may include: selecting a mode of a vehicle based on a mode map which is classified into a power split mode and a parallel mode based on a set request torque and vehicle speed; performing a parallel mode based on a coupling operation of the overdrive brake while adjusting RPM of the first motor and generator to be 0 when the mode of the vehicle is the parallel mode; and converting the mode of the vehicle into the parallel mode by determining whether the RPM of the first motor/generator approaches 0 when the mode of the vehicle selected in the selecting of the mode is the power split mode.

The parallel mode converting process may include first determining whether the RPM of the first motor/generator approaches 0 and secondly determining whether a target RPM of the first motor/generator approaches 0 in response to determining that the RPM of the first motor/generator approaches 0, and when RPM and a target RPM of the first motor/generator approach 0, the mode of the vehicle may be converted into the parallel mode.

The parallel mode converting process may further include: determining whether a request torque is equal to or less than 0 when the RPM or the target RPM of the first motor/generator does not approach 0; and determining whether the engine stops in response to determining that the request torque is equal to or less than 0, and in response to determining that the engine does not stop, the mode of the vehicle may be converted into the parallel mode and in response to determining that the engine stops, the engine stops. In addition, in response to determining that that the request torque is equal to or greater than 0, the power split mode may be performed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
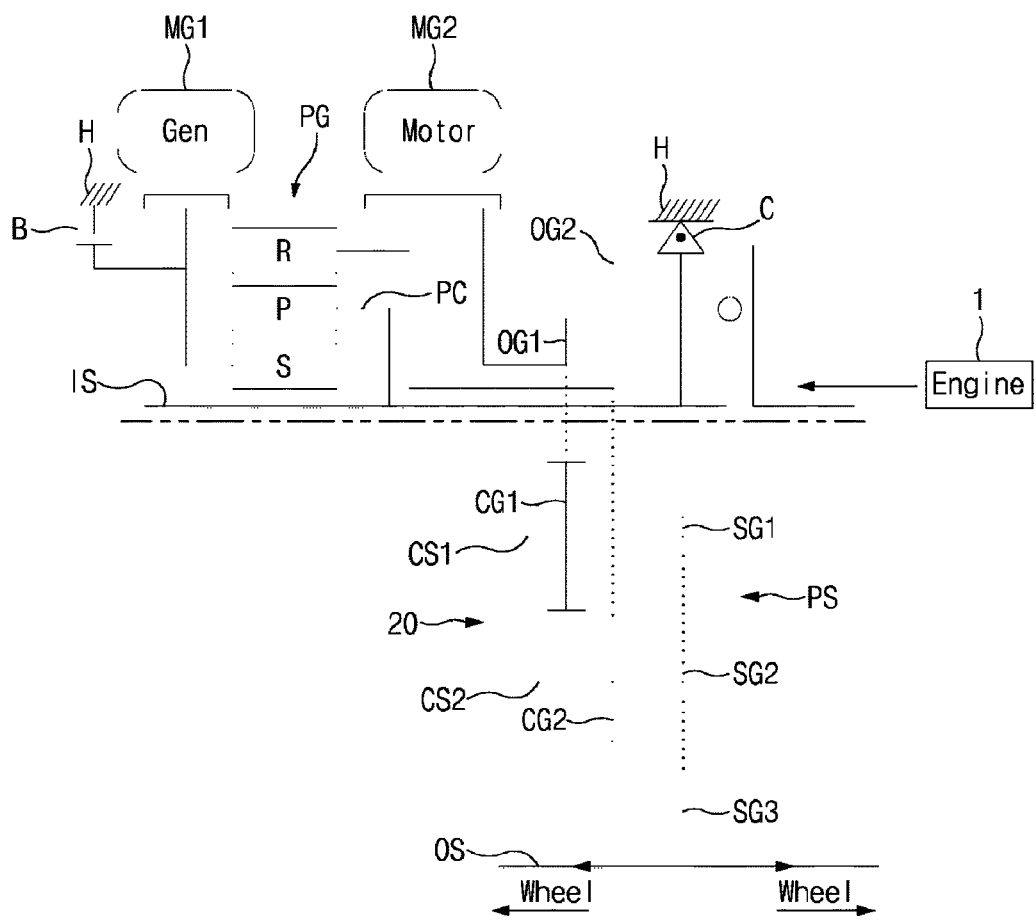
FIG. 1 is an exemplary configuration diagram illustrating a hybrid powertrain according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. For reference, a size, a thickness of a line, and the like of components which are illustrated in the drawing referenced for describing exemplary embodiments of the present disclosure may be slightly exaggerated for convenience of understanding. Further, terms used to describe the present disclosure are defined in consideration of functions in the present disclosure and therefore may be changed based on a user, an intention of an operator, a practice and the like. Therefore, the definition of the terminologies should be construed based on the contents throughout the specification.

FIG. 1 is a configuration diagram illustrating a hybrid powertrain according to an exemplary embodiment of the present disclosure. As illustrated in FIG. 1, in a hybrid powertrain according to an exemplary embodiment of the present disclosure, first and second motor/generator MG1 and MG2, a planetary gear set PG, a rotation restraint mechanism C, an overdrive brake B, first and second output gears OG1 and OG2 may be arranged along an input shaft IS installed within a transmission housing H, to shift rotation power of the engine 1 and rotation power of the first and second motor/generator MG1 and MG2 based on a driving state of a vehicle and to output rotation power of the engine 1 and rotation power of the first and second motor/generator through the first and second output gears OG1 and OG2.

The input shaft IS may be installed lengthwise within the transmission housing H and the input shaft IS may have one side connected to the engine 1 to receive the rotation power of the engine 1. The first motor/generator MG1 may be directly connected to any one of rotating elements of the planetary gear set PG and may operate as a starter motor for driving the engine and generator rotating by being supplied with the rotation power of the engine 1 via the rotating elements to generate electricity. The first motor/generator MG1 may include a stator fixed to the transmission housing H and a rotor connected to the rotating element of the planetary gear set PG.

The second motor/generator MG2 may operate as the motor directly connected to the first output gear OG1 to supply the rotation power. The second motor/generator MG2 may include a stator fixed to the transmission housing H and a rotor connected to the first output gear OG1. The planetary gear set PG may be configured as a plurality of rotating elements as a single pinion planetary gear set installed on the input shaft IS. The planetary gear set PG may include a sun gear S, a planetary carrier PC that rotatably supports a pinion P externally meshed with the sun gear S, and a ring gear R internally meshed with the pinion P.

The sun gear S may be connected to the transmission housing H via the overdrive brake B or may be directly fixed to the transmission housing H. The planetary carrier PC may be connected to the input shaft IS and the ring gear R may be connected to the second output gear OG2 to serve as output elements. The first output gear OG1 may be connected to the second motor/generator MG2 to be supplied with the rotation power of the second motor/generator MG2. The second output gear OG2 may be connected to one side of the planetary gear set PG, that is, the ring gear R to be supplied with the rotation power (see solid lines of FIGS. 3 and 4) of the engine 1 and the rotation power of the first motor/generator MG1 (see a dotted line of FIG. 3) through the ring gear R.

Further, the rotation restraint mechanism C may be installed between the transmission housing H and the input shaft IS to selectively restrict the rotation of the input shaft IS. The rotation restraint mechanism C may be configured of any one of a one way clutch, a two way clutch, and a brake to selectively restrict the rotation of the input shaft IS. The overdrive brake B may be installed near (e.g., adjacent to) the one side of the transmission housing H, that is, the input side and may be connected to at least any one of the sun gear S of the planetary gear set PG and the first motor/generator MG1. The conversion of the power split mode and the parallel mode may be effectively performed by coupling and decoupling the overdrive brake B.

The output shaft OS may be configured to be supplied with power via the first and second output gears OG1 and OG2. Further, a deceleration unit 20 configured to decelerate (e.g., reduce or decrease) power and transfer the decelerated power to the output shaft OS may be disposed between the first and second output gears OG1 and OG2 and the output shaft OS.

In particular, the deceleration unit 20 may include first and second central shafts CS1 and CS2 disposed in parallel with the input shaft IS and the output shaft OS, a first central gear CG1 disposed in about the middle of the first central shaft CS1 to be meshed with a first output gear OG1, a second central gear CG2 disposed in about the middle of the second central shaft CS2 to be meshed with the second output gear OG2, and a power synthetic mechanism (PS) installed to connect the first and second central shafts CS1 and CS2 to the output shaft OS.

Meanwhile, the power synthetic mechanism PS may operate as power synthesizing configured to synthesize the rotation power of the engine 1 transferred through the deceleration unit 20 with the rotation power of the first motor/generator MG1, the rotation power of the second motor/generator MG2, and the like and transfer the synthesized output to the output shaft OS. Accordingly, the power synthetic mechanism PS may be configured to include a first synthetic gear SG1 disposed at one end (e.g., a first end) of the first central shaft CS1, a second synthetic gear SG2 disposed at one end (e.g., a first end) of the second central shaft CS2 to be externally meshed with the first synthetic gear SG1, and a third synthetic gear SG3 disposed in about the middle of the output shaft OS to be meshed with the second synthetic gear SG2.

Figure 2:
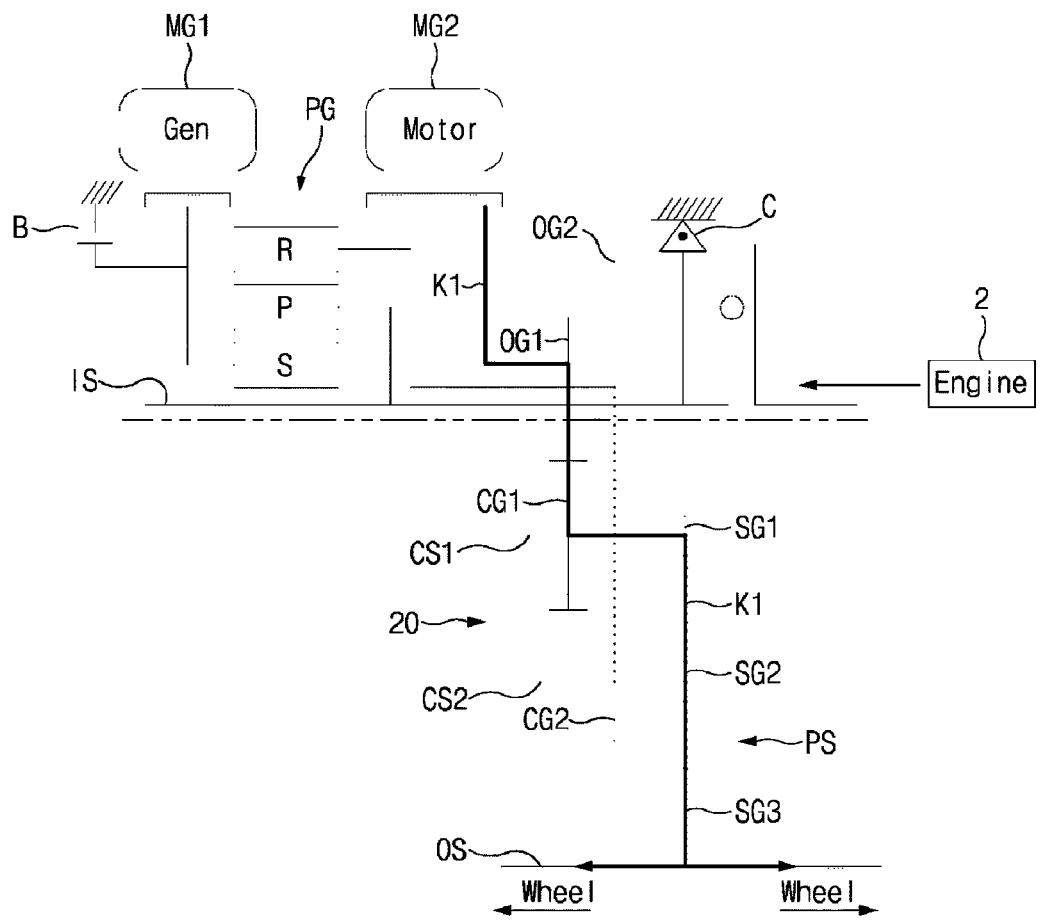
FIG. 2 is an exemplary diagram illustrating a power transfer system in an EV mode of the hybrid powertrain according to the exemplary embodiment of the present disclosure.
Figure 3:
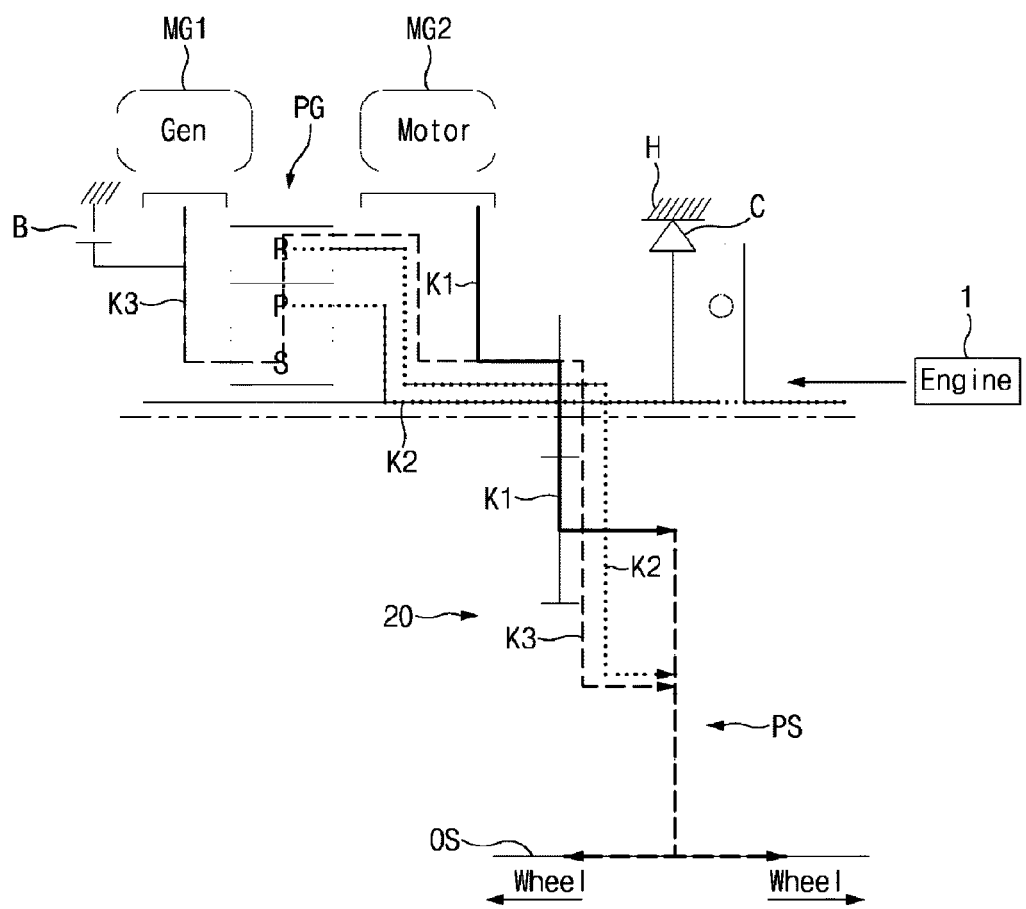
FIG. 3 is an exemplary diagram illustrating a power transfer system in a power split mode of the hybrid powertrain according to the exemplary embodiment of the present disclosure.
Figure 4:
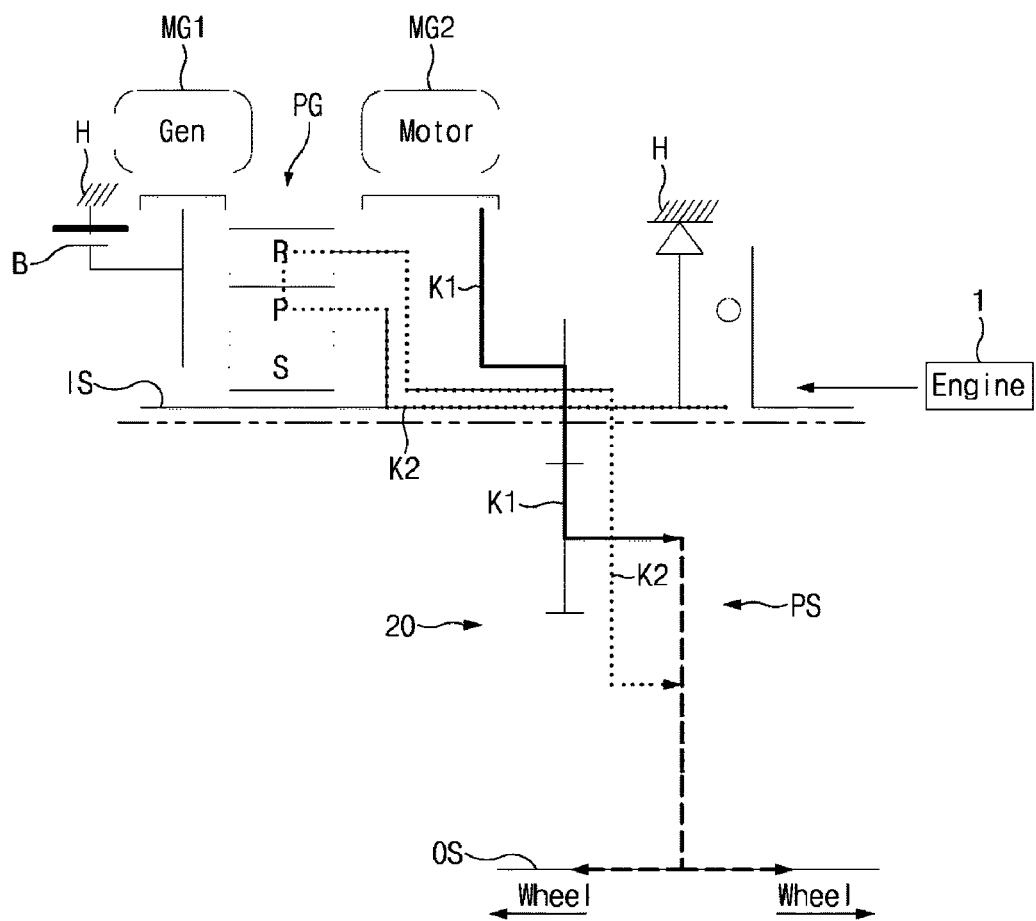
FIG. 4 is an exemplary diagram illustrating a power transfer system in a parallel mode of the hybrid powertrain according to the exemplary embodiment of the present disclosure.

FIGS. 2 to 4 illustrate a power transfer system at the time of an EV mode, a power split mode, and a parallel mode of a hybrid powertrain according to the exemplary embodiment of the present disclosure. As illustrated in FIG. 2, in the EV mode, the rotation of the input shaft IS may be stopped by the coupling operation of the rotation restraint mechanism C and thus only the rotation power of the second motor/generator MG2 is transferred to the output shaft OS via the first output gear OG1, the first central gear CG1, the deceleration unit 20, and the power synthetic mechanism PS when the rotation power of the engine 1 and the rotation power of the first motor/generator MG1 are not transferred (see arrow direction K1 of FIG. 2).

As illustrated in FIG. 3, in the power split mode, the engine 1 may be driven to transfer the rotation power to the output shaft OS and the rotation power of the first motor/generator MG and the rotation power of the second motor/generator MG2 may be transferred to the output shaft OS.

Particularly, the rotation power of the engine 1 may be transferred to the second output gear OG2 via the input shaft IS, the planetary carrier PC, and the ring gear R and then may be transferred to the power synthetic mechanism PS via the second output gear OG2 and the second central gear CS2 (see direction K2 of FIG. 3).

Further, the rotation power of the first motor/generator MG1 may be transferred to the second output gear OG2 via the sun gear S, the pinion P, and the ring gear R of the planetary gear set PG and then may be transferred to the power synthetic mechanism PS via the second output gear OG2 and the second central gear CS2 (see direction K3 of FIG. 3). The rotation power of the second motor/generator MG2 may be transferred to the power synthetic mechanism PS via the first output gear OG1 and the first central gear CS1 (see direction K1 of FIG. 3). Therefore, the power synthetic mechanism PS may be configured to synthesize the rotation power of the engine 1, the rotation power of the first motor/generator MG1, and the rotation power of the second motor/generator MG2 and transfer the synthesized power to the output shaft OS.

As illustrated in FIG. 4, in the parallel mode, as the overdrive brake B may be coupled in the rotation restraint mechanism C, the rotation power of the engine 1 and the rotation power of the second motor/generator may be synthesized in the power synthetic mechanism PS when the rotation power of the first motor/generator MG1 is blocked from being transferred to the sun gear S of the planetary gear set PG and may be transferred to the output shaft OS (see arrow directions K1 and K2 of FIG. 4).

According to the exemplary embodiments of the present disclosure, it may possible to more effectively implement the optimal driving while improving the power transfer efficiency, the drivability, the exhaust performance, and the like by more effectively performing the conversion of the multi mode such as the EV mode, the power split mode, and the parallel mode based on the driving conditions by appropriately coupling and decoupling the overdrive brake B and the rotation restraint mechanism C in the structure in which the two motors/generators MG1 and MG2, the overdrive brake B, and the rotation restraint mechanism C are arranged on the input shaft IS.

In particular, it may be possible to more effectively implement the conversion from the power split mode into the parallel mode based on the driving speed of the vehicle and the driver request torque by appropriately operating the overdrive brake B connected to the sun gear S of the planetary gear set PG or the first motor/generator MG1.

Figure 5:
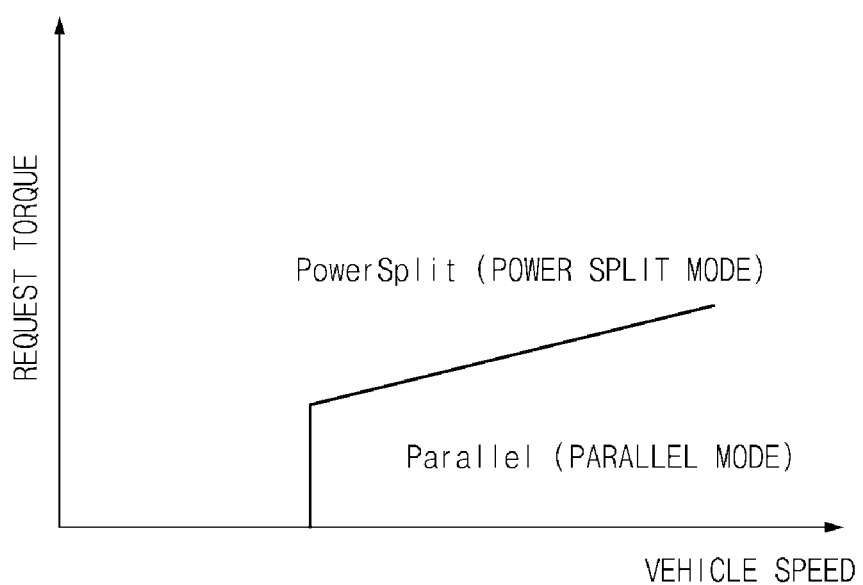
FIG. 5 is an exemplary diagram illustrating a mode map used in a method for controlling a hybrid powertrain according to the exemplary embodiment of the present disclosure.
Figure 6:
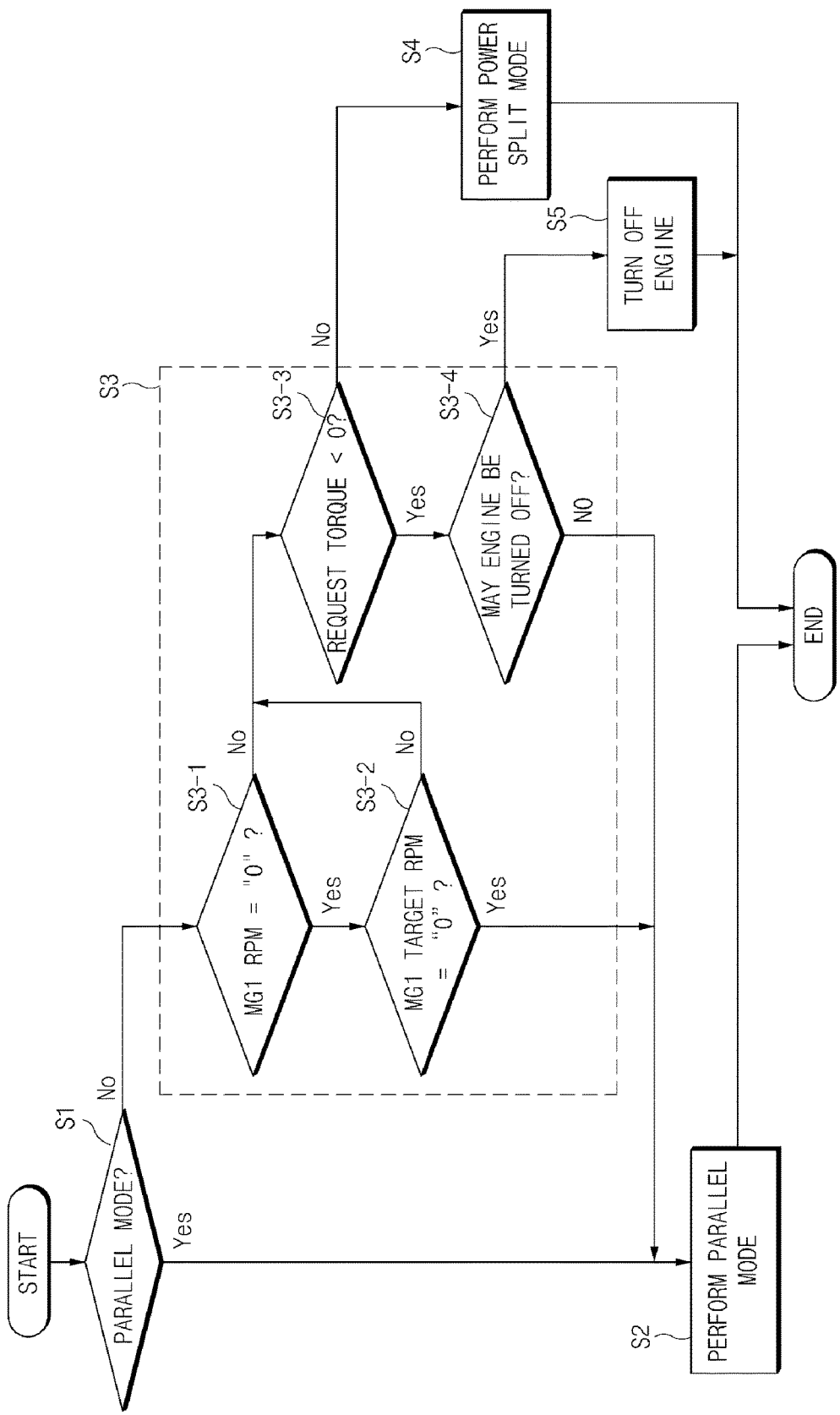
FIG. 6 is an exemplary flow chart illustrating a method of controlling a hybrid powertrain according to an exemplary embodiment of the present disclosure.

FIGS. 5 and 6 are diagrams illustrating a method for controlling a hybrid powertrain according to the exemplary embodiment of the present disclosure. As illustrated in FIG. 6, the method for controlling a hybrid powertrain according to the exemplary embodiment of the present disclosure may include a mode selecting process (S1), a parallel mode progressing process (S2), and a parallel mode converting process (S3). Notably, the process as described herein below may be executed by a controller having a processor and a memory.

The mode selecting process (S1) may include selecting the power split mode and the parallel mode using a mode map. Particularly, the mode map may include the power split mode and the parallel mode classified based on the request torque and the vehicle speed set as illustrated in FIG. 5. Since the engine may not be driven at a predetermined RPM or less, the engine may not be driven in the parallel mode at a predetermined vehicle speed or less. Meanwhile, since the RPM of the engine may be fixed to the vehicle speed in the parallel mode, the driver request torque may be maintained to be less than a maximum torque of the engine. Therefore, in the mode map, the parallel mode may be selected at a predetermined vehicle speed or greater and a predetermined request torque or less and the power split mode may selected with opposite conditions. The mode map may be variously changed based on the drivability, the exhaust performance, and the like.

In the parallel mode progressing process (S2), when the mode of the vehicle selected in the mode selecting process (S1) is a parallel mode, the parallel mode may be performed by the coupling operation of the overdrive brake B while the RPM of the first motor/generator MG1 is adjusted to be about 0. In the parallel mode converting process (S3), when the mode of the vehicle selected in the mode selecting process (S1) is the power split mode, whether the RPM of the first motor/generator MG1 approaches 0 may be determined and thus, the mode may be converted into the parallel mode. Even though the power split mode may be selected by the mode map, the hybrid powertrain may be operated while the RPM of the first motor/generator MG1 approaches 0 based on the driving condition, and thus may be performed in the parallel mode for improved efficiency.

In particular, the parallel mode converting process (S3), may include determining whether the measured RPM of the first motor/generator MG1 approaches 0 (S3-1) and determining whether a target RPM of the first motor/generator MG1 approaches 0 (S3-2) in response to determining that the measured RPM of the first motor/generator MG1 approaches 0. A standard of determining whether the measured RPM of the first motor/generator MG1 approaches 0 may be understood by determining whether an absolute value of the first motor/generator MG1 is equal to or less than a predetermined amount.

In addition, whether a target RPM of the first motor/generator MG1 approaches 0 may be determined since even though the RPM of the first motor/generator MG1 approaches 0, the conversion into the parallel motor may not be performed even when the target RPM of the first motor/generator MG1 does not approach 0. For example, when a current RPM of the first motor/generator MG1 is about 5000 and the target RPM of the first motor/generator MG1 is about −5000, a driving section in which the RPM of the first motor/generator MG1 is slowly reduced and then approaches 0 may be generated. However, since the target RPM of the first motor/generator MG1 may be about −5000, the target RPM may not be satisfied during the parallel mode driving.

Further, when the target RPM of the first motor/generator MG1 approaches 0, the parallel mode may be performed (S2) (e.g. may be converted into). When the RPM and the target RPM of the first motor/generator MG1 do not approach 0, whether the request torque is equal to or less than 0 may be determined and when the request torque is equal to or less than 0, whether the engine may stop may be determined. In response to determining that the request torque is equal to or greater than 0, the power split mode may be performed (S4) (e.g., may be converted into) and in response to determining that the engine may stop, the engine 1 may be stopped (S5).

Meanwhile, when the driver request torque is equal to or less than 0, the engine 1 may be stopped to improve efficiency. Additionally, when the vehicle speed is substantially high (e.g., greater than a predetermined speed), the torque of the first motor/generator MG1 may be insufficient when the engine 1 stops and then restarts and thus the restarting may not often be performed. In particular, the engine 1 may be driven often (e.g., at predetermined frequency) by the first motor/generator MG1 in the fuel cut state without stopping the engine 1 and, the electric energy may be consumed and therefore the efficiency may be reduced.

Therefore, whether the engine 1 stops may be determined by determining that the torque of the first motor/generator MG1 is sufficient to restart the engine 1 based on the vehicle speed, the RPM of the first motor/generator MG1 during the stopping of the engine 1, the torque in response to the RPM, and the like. Further, in response to determining whether the driver request torque is equal to or less than 0, the stopping of the engine 1 may be prevented (e.g., the engine may not be stopped), the parallel mode may be performed (S2) and it may be advantageous in efficiency to drive the engine 1 in the fuel cut state.

As described above, according to the exemplary embodiments of the present disclosure, it may be possible to more effectively perform the mode conversion based on the current state of the vehicle by implementing the conversion into the parallel mode based on the determination on whether the RPM of the first motor/generator MG1 approaches 0 and thus more stably maintaining the optimal driving state.

According to the exemplary embodiments of the present disclosure, it may be possible to more effectively implement the optimal driving while improving the power transfer efficiency, the drivability, the exhaust performance, and the like by more effectively performing the conversion of the multi mode such as the EV mode, the power split mode, and the parallel mode depending on the driving conditions by appropriately coupling and decoupling between the overdrive brake and the rotation restraint mechanism in the structure in which the two motors/generators, the overdrive brake, and the rotation restraint mechanism are arranged on the input shaft.

In particular, it may be possible to more effectively implement the conversion from the power split mode into the parallel mode based on the driving speed of the vehicle and the driver request torque by appropriately operating the overdrive brake connected to the sun gear of the planetary gear set or the first motor/generator. Further, according to the exemplary embodiments of the present disclosure, it may be possible to more effectively perform the mode conversion based on the current state of the vehicle by implementing the conversion into the parallel mode based on the determination of whether an RPM of the first motor/generator approaches 0 and thus more stably maintaining the optimal driving state.

Hereinabove, the specific exemplary embodiments of the present disclosure are described but the present disclosure is not limited to the disclosed exemplary embodiments and the accompanying drawings and may be variously changed without departing from the spirit and the scope of the present disclosure.

What is claimed is:

1. A method for controlling a hybrid powertrain including a planetary gear set installed on an input shaft, first and second motors and generators, an overdrive brake configured to transfer rotation power of the first motor and generator to the planetary gear set, and at least one rotation restraint mechanism configured to selectively limit a rotation of the input shaft, the method comprising:
   selecting, by a controller, a mode of a vehicle being driven based on a mode map classified into a power split mode and a parallel mode based on a set request torque and vehicle speed;
   performing, by the controller, a parallel mode based on a coupling operation of the overdrive brake while adjusting revolutions per minute (RPM) of the first motor and generator to be zero when the selected mode of the vehicle is the parallel mode; and
   converting, by the controller, the mode of the vehicle into the parallel mode by determining whether the RPM of the first motor and generator approaches zero when the selected mode of the vehicle is the power split mode.

2. The method according to claim 1, wherein the converting of the parallel mode includes:
   determining, by the controller, whether the RPM of the first motor and generator approaches zero;
   determining, by the controller, whether a target RPM of the first motor/generator approaches zero in response to determining that the RPM of the first motor/generator approaches zero, and
   converting, by the controller, the mode of the vehicle into the parallel mode when RPM and a target RPM of the first motor and generator approach zero.

3. The method according to claim 2, wherein the converting of the parallel mode includes:
   determining, by the controller, whether a request torque is equal to or less than zero when the RPM or the target RPM of the first motor and generator does not approach zero;
   determining, by the controller, whether the engine stops in response to determining that the request torque is equal to or less than zero; and
   converting, by the controller, the mode of the vehicle into the parallel mode when the engine does not stop, and then stopping the engine.

4. The method according to claim 3, further comprising:
   operating, by the controller, the power split mode in response to determining that the request torque is equal to or greater than zero.

* * * * *